United States Patent [19]

D'Amico

[11] Patent Number: 4,824,507

[45] Date of Patent: Apr. 25, 1989

[54] PROCESS TO PRODUCE ENVELOPED FIBERGLASS PRODUCT

[75] Inventor: John A. D'Amico, Easton, Pa.

[73] Assignee: Molded Accoustical Products, Easton, Pa.

[21] Appl. No.: 52,454

[22] Filed: May 28, 1987

[51] Int. Cl.⁴ ............................................. B32B 31/04
[52] U.S. Cl. .................................... 156/245; 156/267; 428/74; 428/78; 428/192; 264/252; 264/258
[58] Field of Search ............... 156/222, 224, 228, 245, 156/267, 529, 522, 552; 264/251, 252, 257, 258, 271.1; 428/68, 74, 76, 78, 192

[56] References Cited

U.S. PATENT DOCUMENTS

| | | | |
|---|---|---|---|
| 3,415,708 | 12/1968 | Rondum | 428/76 |
| 3,829,245 | 4/1975 | Fetherston et al. | 156/245 |
| 4,486,482 | 12/1984 | Kobayashi et al. | 428/74 |
| 4,504,347 | 3/1985 | Munk et al. | 156/245 |
| 4,620,890 | 11/1986 | Myers et al. | 156/245 |
| 4,671,972 | 1/1987 | Adiletta | 428/74 |

FOREIGN PATENT DOCUMENTS 2264702 12/1975 France ................................... 428/76

Primary Examiner—Caleb Weston
Attorney, Agent, or Firm—Steele, Gould & Fried

[57] ABSTRACT

A molded fiberglass product and process for producing that product are disclosed. A fiberglass mat is molded to a desired shape. It is trimmed and placed between two sheets of facing fabric, the facing fabric pretreated with a thermoset binder and a heat activated adhesive. The facing sheets and fiberglass mat are placed into a press with a heated mold where the fiberglass is compressed at its edges and the sheets are sealed to the fiberglass and beyond the fiberglass edges to each other. The resultant workpiece is trimmed and the final product is a completely enveloped molded fiberglass product with all fiberglass surfaces and edges, both external and internal, enveloped in facing, no fiberglass exposed.

5 Claims, 3 Drawing Sheets

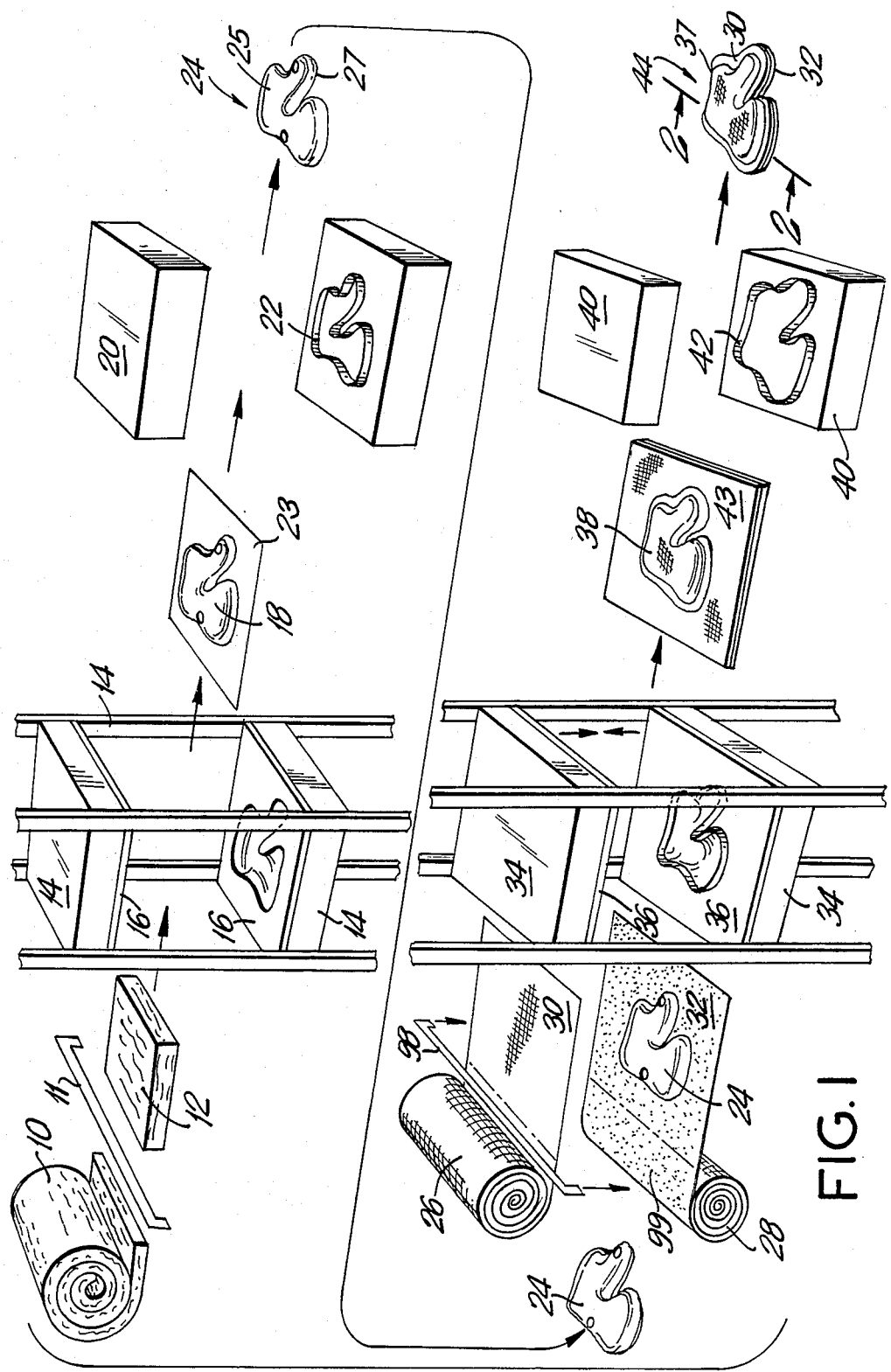

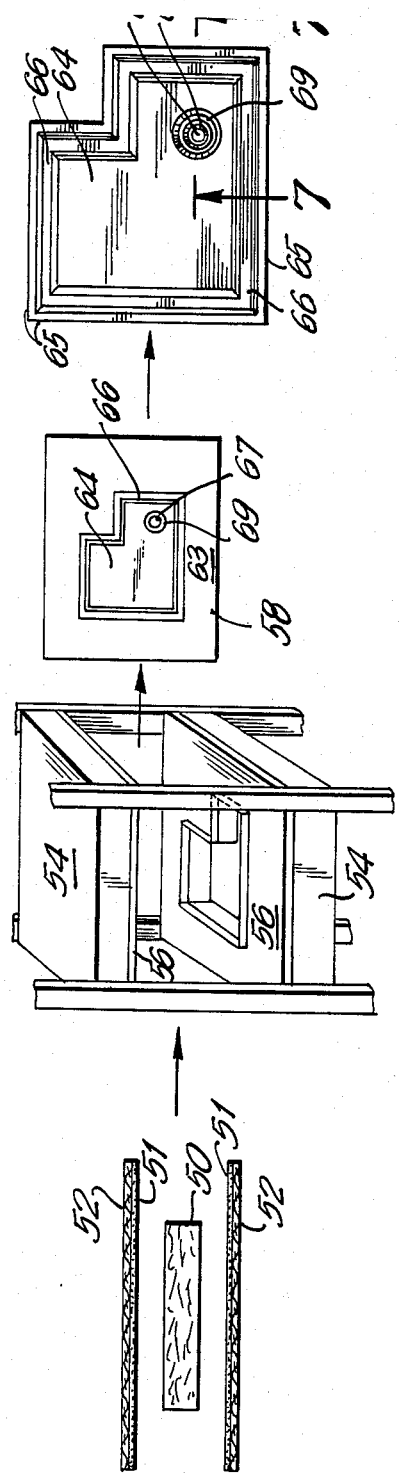
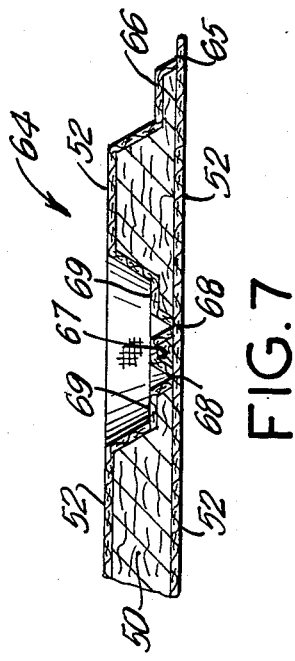
FIG.6
FIG.7

PROCESS TO PRODUCE ENVELOPED FIBERGLASS PRODUCT

BACKGROUND OF THE INVENTION

1. Field of the Invention

This invention relates to laminated product combined with processes for molding and, more particularly, to a method for applying facing to fiberglass.

2. Description of the Prior Art

Fiberglass is a popular insulating material used in many industries. In particular, it is frequently used in molded form to serve as a sound deadening and heat insulating element surrounding engines or on the walls of engine compartments. Despite its valuable properties, uncoated and unfaced fiberglass can present problems of deterioration of product and irritation to the user. First, many workers are reluctant to use fiberglass, perceiving it to be uncomfortable and irritating to handle. The second problem is that fiberglass, by its nature, is easily abraded and torn. When cut, fiberglass may produce an irritating dust at the cut edge due to the friable nature of the material.

Presently, some manufacturers are trying to solve these problems by partially covering the molded piece of fiberglass, putting a facing on one side. This protects users from rubbing against its outer surface. One sided facing also provides some abrasion and deterioration protection for the piece itself. Some manufacturers (such as batting producers) cover both surfaces of the fiberglass with paper, thereby protecting the users from contact with the fiberglass on its broad surfaces.

However, most users handle the fiberglass by the edges, and this is particularly true for molded pieces. It is, therefore, the edges which have exposed fiberglass; and produce the most fiberglass dust where the piece is cut. Another disadvantage with the prior art of molded fiberglass pieces is that they are also particularly susceptible to breaking at the edges, the area not covered by a durable facing.

Lastly, the irregular topography required of some of the molded fiberglass pieces has been particularly difficult to face with protective fabric by any of the aforementioned methods because the facing bunches and folds, which is aesthetically unacceptable in most applications.

There is, therefore, a need for a totally enveloped molded fiberglass workpiece which is covered on all surfaces, including interior and external edges, fastening holes and cut-outs, and which is durable, has reduced deterioration, improved comfort of handling, and a smooth physical appearance.

SUMMARY OF THE INVENTION

The aformentioned prior art problems are obviated by the process of this invention which produces a molded, completely enveloped fiberglass product in which all surfaces and all internal and all external edges, fastening holes and cut-outs are covered by a laminated fabric facing to enhance appearance, reduce abrasion, improve comfort in handling, and provide improved durability. In the preferred embodiment, after initial molding of the piece, the molded fiberglass workpiece is placed in a second heated press mold with a sheet of facing fabric on its top and bottom. The facing fabric is preferably polyester which has been pretreated with a thermoset binder, preferably a vinyl chloride copolymer. One side of the fabric is also coated with an adhesive, preferably a water based, heat activated, acrylic adhesive. The second heated mold is very important it is of similar configuration as the molded fiberglass workpiece, but it contains, additionally, a circumferential area to compress the facing fabric to form a lip around the fiberglass. After this second molding, the enveloped fiberglass workpiece is trimmed, preferably by a die cut, so that the resultant product is a fiberglass molded piece with all surfaces including inner and outer edges enveloped in facing fabric which totally adheres to the workpiece and ends in a lip of fabric bound to fabric at all edges. The facing fabric encapsulates the fiberglass with no folds or bunching and with no fiberglass exposed at any edge.

Another embodiment is particularly suitable for pieces with straight edges and little variation in topography. In this embodiment, a blank fiberglass mat is placed between two sheets of the preferred facing fabric. The mat and the fabric are molded together in a single molding operation. This mold has areas of severe edge compression incorporated into its design. When trimmed, the resultant product is completely covered on its surfaces with the facing fabric and at its edges is extremely compressed so that only a minimal, ie. about 1.0 millimeter portion of fiberglass edge is exposed sandwiched between the facing fabric.

It is, therefore, an object of this invention to provide a completely enveloped molded fiberglass product with every external and internal edge covered by facing fabric.

It is another object of this invention to provide apparatus to produce a completely enveloped molded fiberglass product with every external and internal edge with a lip of laminated facing fabric.

It is also an object of this invention to provide a process and laminated double faced fiberglass molded product with only a minimal fiberglass edge exposed.

It is yet a further object of this invention to provide a process to produce molded laminated products of irregular topography and internal as well as external edges.

These and other objects will be more readily ascertainable to one skilled in the art from a consideration of the following figures, description and exemplary embodiments.

BRIEF DESCRIPTION OF THE DRAWING(S)

FIG. 1 is a schematic illustration of the process steps used to produce the molded and completely enveloped fiberglass product of this invention.

FIG. 6 is a schematic illustration of the process steps used to produce an alternative embodiment of a molded and double-faced fiberglass product in which edge compression is illustrated.

Figure 3:
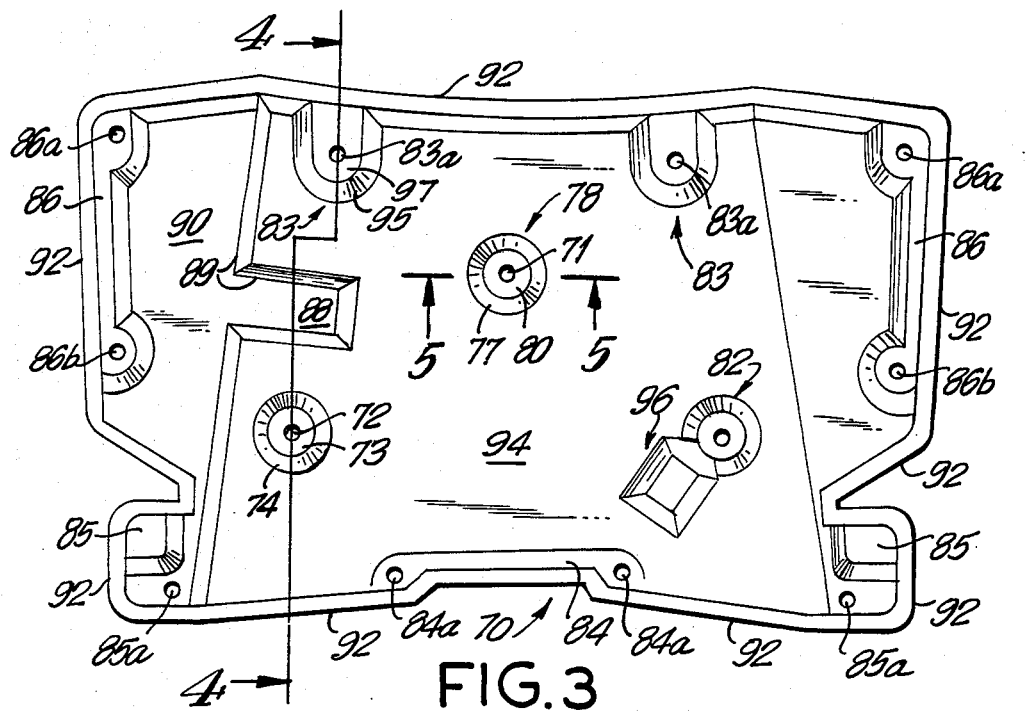
FIG. 3 is an isometric view of a complex molded fiberglass product with an irregular topography and completely enveloped in facing.

FIG. 7, taken on lines 7—7 of FIG. 6, is a cross section of the product produced by the alternative embodiment of FIG. 6.

DETAILED DESCRIPTION OF THE PREFERRED EMBODIMENT(S)

Referring now to the drawings, and more particularly to FIG. 1, a schematic illustration shows the steps of one of the embodiments of the process of this invention. Uncured fiberglass, preferably supplied in roll 10, is trimmed by cutter 11 to yield an appropriately sized uncured fiberglass mat 12. Uncured fiberglass is the raw mat of which the thermosetting binder has not been cured by temperature. It is soft and has slightly tacky properties. Fiberglass 10 is rotary spun fiberglass which includes a 20% thermosetting binder which is sprayed on as the fibers are spun out to filaments, as is well known in the art.

Mat 12 is fed into press 14 which has been fitted with heated mold 16. The process of this invention is especially preferred for enclosing or laminating molded workpieces of irregular topography for use as acoustical insulation pieces for automobiles, i.e. hood insulators, fender insulators, and other engine compartment insulators as well as interior components. Mold 16 is shown with an irregular contoured configuration schematically corresponding to a piece used as insulation in the fender of trucks and will be discussed in detail in subsequent Figures. Heated mold 16 operates at a preferred temperature of about 400° Farenheit to about 450° Farenheit. Press 14 operates at a preferred pressure of about 400 to about 1200 pounds per square foot (psf), depending upon the density of the required fiberglass finished product. The more dense the mat, the greater the pressure required to insure that the thickness required of the molded shape will be achieved. Molded fiberglass mat 18 is removed from mold 16 and excess fiberglass 23 is cut from the edges of the mold. It is preferred that die cutting apparatus 20 with die 22 be used for trimming, but water jet or knife cut are acceptable trimming procedures and are well known in the art.

The trimmed fiberglass workpiece 24, now in its semi-final form with top 25 and bottom 27, is then fed through two rolls 26 and 28 of facing fabric. It is preferred that the facing fabric be a non-woven polyester fiber blend impregnated with a thermoset binder, preferably vinyl chloride copolymer. Rayon and other durable and abrasion-resistant fabrics may be used and an acrylic binder is also possible, but for durability and wrinkle-free application, a polyester fabric with the specified binder has proven most satisfactory. One surface of the fabric is also preferably pre-coated with a water based, heat activated, preferably, acrylic adhesive 99.

As fabric advances from rolls 26 and 28, adhesive sides facing each other, separate fabric sheets 30 and 32 are cut from rolls 26 and 28 respectively by cutting bar 98 to sandwich molded fibeglass workpiece 24. Workpiece 24, now sandwiched between fabric sheets 30 and 32 with adhesive 99 touching top 25 and bottom 27, is fed into a second press 34. Second press 34 has heated mold 36 which is similar in configuration to mold 16 in heated press mold 14, but its entire outer circumference is enlarged to produce a compressed lip around every outer edge, as will be discussed in detail with reference to FIG. 2 and other Figures. The circumferences of any interior cutaways or apertures are smaller than those of mold 16 so that mold 36 produces a lip around all interior edges, such as fastening holes and cut-outs, as well as exterior edges. Molded workpiece 24 and fabric sheets 30 and 32 are then molded and sealed together by heated mold 36. It is preferrred that second heated mold 36 operate at a temperature of about 250° Farenheit to about 300° Farenheit and the second press 34 with a pressure of about 400 pounds per square foot. The pressure selected must be great enough to compress and adhere the fabric to the insulation. Temperatures must be adequate to activate the binder in the fabric and to fuse the adhesive.

Sealed and completely enveloped fiberglass/fabric workpiece 38 is then trimmed, preferably in die cutting apparatus 40 with die 42, to eliminate excess fabric 43 and produce finished product 44—acoustical insulation for trucks which is placed between the fender and the engine compartment. Product 44 has no fiberglass exposed, not on its surfaces which are covered with facing 30 and 32, nor on its lip 37, as can be seen more clearly in FIG. 2. All product edges resulting from the process just described are single layers of polyester fabric sealed to each other. The product thus produced is totally enveloped and is durable, dust free, non-irritating, and not suseptible to abrasion on its edges.

Figure 2:
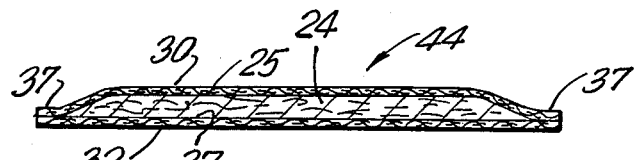
FIG. 2 is a cross section of the fiberglass end product taken on lines 2—2 of FIG. 1.

Now referring to FIG. 2, a cross section of finished product 44 made in mold 36 of FIG. 1, and taken from lines 2—2 of FIG. 1, is illustrated. As illustrated in FIG. 1, mat 12 is seen molded to have an uneven contour or topography on top surface 25 and a relatively flat bottom 27. Top surface 25 has been fused to facing fabric 30 and bottom 27 to facing fabric 32 to form finished product 44 with a rounded top and flat bottom. At its edges, a lip 37 is seen. Although product 44 (in this example a fender insulator) is about 25.4 mm thick at its center, it is seen to be compressed at its edges until only two layers of facing fabric remain sealed together with no intermittent fiberglass to make lip 37 and completely envelop fiberglass workpiece 24 with a thickness of about 0.5 mm at lip 37.

Figure 4:
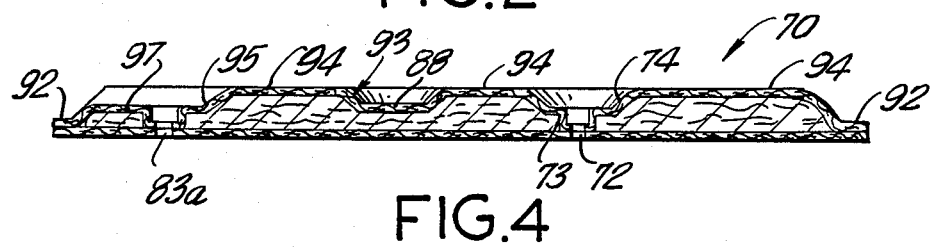
FIG. 4 is a cross section taken on lines 4—4 of FIG. 3.
Figure 5:
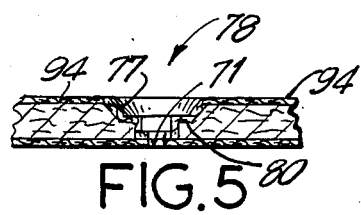
FIG. 5 is a cross section taken on lines 5—5 of FIG. 3.

Now referring to FIGS. 3, 4, and 5, a molded and completely enveloped fiberglass product 70 of irregular topography and contours is illustrated. Product 70 is a hood insulator which is shaped to be placed inside the hood of an automobile. For illustrative purposes, product 70 is described in detail. Product 70 is approximately three feet wide and two feet high. It is approximately 45 mm thick in general area 94, except for areas molded to fit around protrusions on the vehicle's engine, and is about 6.0 mm thick at its edges. It also has many apertures and depressions to accommodate various protrusions on the vehicle hood. At all exterior edges 92, product 70 is only the thickness of two layers of fabric, about 0.5 mm., and has no fiberglass In the various depressions, such as areas 97 and 77, product 70 is compressed to a thickness of about 6.0 mm. For example, in general area 78, aperture 71 is provided to receive a mounting fastener. Circumferential lip 80, immediately surrounding aperture 71, is a lip formed of only two layers of fabric and, again, is about 0.5 mm thick. Compressed area 77 immediately surrounding lip 80 is compressed fiberglass encapsulated by two layers of fabric and is approximately 6.0 mm thick. All areas 78, 82, 83 and 74, and cut-out area 96 are similarly molded. Edge areas 84, 85, and 86 are similar in that their edges 92 are only the thickness of two layers of fabric. Areas 83, 84, 85, and 86 include apertures 83a, 84a, 85a, 86a and 86b respectively, which are surrounded by lips as described in reference to area 78. Completely surrounding product 70 is a circumferential fabric lip 92 which is approximately 0.5 mm thick and about 3.0 mm wide. Areas 88 and 90 are compressed at their interior boundary 89 to fit around the indentations in the car hood and to provide clearance to the vehicle's engine. At boundary 89, the mold has compressed to a thickness of approximately 4.0 mm.

Thus, although there are a great many surfaces and apertures, each interior and exterior edge is completely enveloped with laminated fabric to form a fabric lip. No fiberglass is exposed and the facing fabric fits smoothly to all contours. The fabric-to-fabric lips are narrow and flexible, and thus do not interfere with the snug placement of the insulator in the hood of the vehicle.

Now referring to FIG. 4, a cross section taken on line 4—4 of FIG. 3 illustrates the multi-layers of the fiberglass product of this invention. General area 94 is aproximately one and one half inches thick, compressed areas 93, 95 and 74 are approximately 6.0 mm thick, and lips 92, 97, and 73 are approximately 0.5 mm thick. It can be seen that even at apertures 72 and 83a, no fiberglass is exposed because all surfaces are encapsulated with fabric to completely envelop the fiberglass.

Now referring to FIG. 5, a cross section taken on line 5—5 of FIG. 3 illustrates aperture area 78 as an example of all the apertures in product 70. Aperture 71 is surrounded by lip 80. Adjacent to lip 80 is compressed area 77 which spans the distance between lip 80 and rounded surface area 94, all as previously described in reference to FIGS. 3 and 4.

Now referring to FIG. 6, an alternative embodiment of the process of this invention is illustrated schematically. The process described in FIG. 6 is useful for straight edged solid workpieces in which the topography is not multilevel and in which there are few edges and no apertures. Fiberglass mat 50 is placed between two sheets 52 of facing fabric. As with the process of FIG. 1, facing fabric 52 is preferably on rolls and fiberglass mat 50 is placed on the sheets as they come off the rolls, adhesive sides 51 towards each other. In FIG. 6, pieces 58 and 64 are shown rotated 90° to better illustrate their shape. As previously described, fiberglass mat 50 is spun fiberglass with at least 20% binder, although any fiberglass is suitable to the process. Facing fabric sheets 52 are preferably polyester with a vinyl chloride copolymer binder; and each sheet 52 is coated on side 51 with a water based, heat activated acrylic adhesive.

Adhesive sides 51 of fabric sheets 52 are placed facing fiberglass mat 50. Sheets 52 surrounding mat 50 are placed in press 54 which contains heated mold 56. After applying heat of about 375°–400° Farenheit and pressure of about 600 pounds per square foot to the fiberglass and fabric, a molded, faced workpiece 58 is produced. Workpiece 58 is seen to have stepped down area 66, aperture 67, and edges 65. Trimmed piece 64 is compressed at its edges to produce stepped down area 66 and then pinched at its edges to form edge 65. The same stepping down and pinching occurs at aperture 67 which is surrounded by stepped down area 69 and pinched edge 68. More pressure is required in this embodiment in order to pinch the fabric and insulation enough that the wastage 63 will easily break off. Temperatures must be adequate to activate the binders in the fiberglass and fabric and to fuse the adhesive. The fine edge will break away from workpiece 58 similar to a die cut edge, leaving wastage 63 to fall away. Finished trimmed part 64 with pinched edge 65, in this example a fire-wall insulator, is produced.

Mold 56 is shaped so that all the outer edges of the finished product are first stepped down to area 66 and then pressed to a very fine edge 65 (approximately 0.5 mm), the edge being only a small fraction of the thickness of the center of the trimmed piece 64. The resultant product has extremely narrow edges composed of two layers of fabric 52 sandwiching an extremely compressed layer of fiberglass. Although this process does not completely envelop the product as does the method of FIG. 1, this method is an improvement over the methods currently practiced in the art and greatly reduces the amount of fiberglass exposed.

Now referring to FIG. 7, taken on line 7—7 of FIG. 6, a cross section of trimmed workpiece 64 is illustrated. Trimmed workpiece 64 is a product intended to be used in automotive components, such as a fire-wall insulator, is relatively flat on both surfaces and includes only one aperture 67. Mat 50 is compressed at its edges to a thickness of about 0.5 mm to form a lip edge 65. Fabric 52 is sealed to both top and bottom surfaces of product 64, so that the only exposed fiberglass is on the lip edges 65. Aperture 67 is likewise pinched to form a stepped down area 69 of about 6 mm and edges 68 of about 0.5 mm so that mat 50 and fabric 52 easily punch out of area 67 to form an aperture. Thus, even at an aperture, only a very fine edge of fiberglass may be exposed.

Both processes, that of FIG. 1 and that of FIG. 6, solve the problem of exposed fiberglass edges by employing a press and heated mold to provide fiberglass workpieces with either completely encapsulated edges (FIG. 1) or pinched edges (FIG. 6).

There are several variations which can be practiced within the scope of this invention. First, there are two main embodiments to the process of this invention. The first process is applicable to molded fiberglass pieces having complex topography and apertures, the second process to fiberglass intended to be molded into simpler shapes.

The fabric may be non-woven polyester with a thermoset binder, or it may be any durable, abrasion resistant fabric, such as nylon, rayon, and other synthetic fabrics, or natural fiber fabrics.

The adhesive is preferred to be a water based, heat activated acrylic adhesive, but other known adhesives which are capable of withstanding the forces of the press and heated mold may be used and be within the scope of this invention.

The molds are made of cast or machined aluminum, but epoxy, steel or other materials as are known in the art are also possible.

Also, the binder in the fabric is preferred to be a vinyl chloride copolymer, but other binders, in varying percentages, may be used within the scope of this invention.

There are many advantages to the product and process of this invention. Chiefly, the completely enveloped and laminated fiberglass molded product is rendered abrasion resistant, non-irritating, and presents a smooth appearance. It is durable and easy to work with. There is no wrinkling or uneveness of fabric.

Also, the process described is applicable to any shaped mold used with a variety of qualities of fiberglass and a variety of binders, adhesives, and facing materials.

Having now illustrated and described my invention, it is not intended that such description limit this invention, but rather that this invention be limited only by reasonable interpretation of the appended claims.

What is claimed is:

1. A process for producing a laminated and enveloped fiberglass sandwiched product of irregular topography, said product having every internal and external edge terminating in a lipped and enveloped boundary to thereby totally enclose said fiberglass, said process comprising the steps of:
   (a) providing a first press including a heated mold;
   (b) feeding a fibrous fiberglass blank mat into said first press;
   (c) simultaneously pressing and heat molding said fiberglass mat into a predetermined shape of irregular topography;
   (d) trimming excess fiberglass to produce a semi-final, molded workpiece with an irregular shape;
   (e) providing two sheets of polyester facing fabric including a thermoset binder, one fabric surface including thermoset adhesive;
   (f) placing said trimmed fiberglass workpiece between said two sheets of facing fabric, one said sheet on the top of said workpiece, said other fabric sheet on the bottom of said trimmed workpiece, both said sheets' thermoset adhesive surfaces facing said work piece and each other;
   (g) providing a second press, said second press including a second heated mold having a similar configuration as said first mold and including generally an oversized circumferential mold area to allow for edge binding compression of said fabric edges;
   (h) feeding said trimmed workpiece and said fabric sheets together into said second press;
   (i) heat pressure molding said fabric and workpiece to produce a laminated fiberglass to fabric workpiece including a fabric to fabric edged lip whereby said workpiece, including each and every fiberglass edge is enveloped by said fabric; and,
   (j) trimming excess fabric to produce thereby a product with fabric surrounding all fiberglass surfaces with no fiberglass edges or surfaces exposed.

2. The process to produce a laminated and enveloped fiberglass sandwiched product according to claim 1 wherein said facing fabric is polyester with a vinyl chloride copolymer binder.

3. The process to produce a laminated and enveloped fiberglass sandwiched product according to claim 1 wherein said heat in said first heat mold is between about 400° Farenheit to about 450° Farenheit and the pressure is from about 400 pounds per square foot to about 1200 pounds per square foot and wherein said heat in said second heat mold is between about 250° Farenheit to about 300° Farenheit and the pressure is about 400 pounds per square foot.

4. The process to produce a laminated and enveloped fiberglass sandwiched product according to claim 1 wherein said trimming in steps (c) and (i) is done by die cut apparatus, said die cut apparatus including means to produce apertures in said fiberglass workpiece.

5. A process for producing a sandwiched fiberglass product of irregular topography, said product having pinched edges, the process comprising the steps of:
   (a) providing two rolls of polyester facing fabric including a thermoplastic binder, one surface of which includes thermoset adhesive;
   (b) providing a fibrous fiberglass blank mat;
   (c) advancing facing fabric from said rolls and placing said fiberglass blank mat between two sheets of said facing fabric, said adhesive surface of said fabric adjacent to said fiberglass blank;
   (d) providing a press, said press including a heated mold, said mold of the dimensions of the end product but including a generally oversized area to allow for edge binding compression of said fiberglass and fabric;
   (e) feeding said fiberglass blank mat and said fabric into said press;
   (f) pressure heat molding said fiberglass and said fabric to produce a workpiece with compressed edges;
   (g) breaking excess fiberglass and fabric at said compressed edge to produce thereby a product with a reduced edge lip consisting essentially of fabric.

* * * * *